United States Patent [19]
DeMont

[11] Patent Number: 5,812,936
[45] Date of Patent: Sep. 22, 1998

[54] ENERGY-EFFICIENT TIME-DIVISION RADIO THAT REDUCES THE INDUCTION OF BASEBAND INTERFERENCE

[75] Inventor: Jason Paul DeMont, Basking Ridge, N.J.

[73] Assignee: Lucent Technologies, Inc., Murray Hill, N.J.

[21] Appl. No.: 530,042

[22] Filed: Sep. 19, 1995

[51] Int. Cl.$^6$ ........................................................ H04B 1/10
[52] U.S. Cl. ............................ 455/63; 455/117; 455/522; 455/575; 370/321; 370/442
[58] Field of Search ................................. 455/127, 126, 455/63, 50.1, 75, 76, 89, 95, 91, 115, 103, 117, 422, 500, 501, 517, 522, 67.1, 575; 370/321, 442, 528; 375/312, 313

[56] References Cited

U.S. PATENT DOCUMENTS

| | | | |
|---|---|---|---|
| 4,521,912 | 6/1985 | Franke et al. | 455/115 |
| 4,564,867 | 1/1986 | Nakajima | 358/342 |
| 4,694,466 | 9/1987 | Kadin | 455/76 |
| 4,697,281 | 9/1987 | O'Sullivan | 455/69 |
| 5,157,661 | 10/1992 | Kanai et al. | 370/95.1 |
| 5,612,955 | 3/1997 | Fernandes et al. | 370/528 |

FOREIGN PATENT DOCUMENTS

| | | |
|---|---|---|
| 0 535 669 A1 | 10/1992 | European Pat. Off. . |
| 2 238 449 | 11/1989 | United Kingdom . |
| WO 92/06546 | 4/1992 | WIPO ............................. H04J 4/00 |

OTHER PUBLICATIONS

"Interference from the TDMA structure in digital mobile communication to PSTN", TF Televerkets Forskningsinstitutt, TF R 40/92, pp. 1–13 and Annex 1–15; GSM 05.90, version 4.0.0; Feb. 1993, pp. 5–9.

"Interference to Hearing Aids by the New Digital Mobile Telephone System", Global System for Mobile (GSM) Communications Standard, K. H. Joyner, M. Wood, E. Burwood, D. Allison, R. LeStrange, National Acoustic Laboratories, A Division of Australian Hearing Services, Sydney, 30 Mar. 1993, pp. i–13.

"Pacemakers, Other Devices May Be Vulnerable to Wireless Technology", L. Neergaard, The Associated Press, Oct. 6, 1994.

Stray Signals: Clutter on Airwaves Can Block Workings of Medical Electronics, T. Knudson, W. M. Bulkeley, Wall Street Journal, Jun. 15, 1994, p. A1.

"Digital Cell Phones Can Interfere With Pacemakers", Steve Young, Show: Moneyline, 7:33 PM EST, Apr. 28, 1995, Transcript #1407–2, Cable News Network, Inc. (CNN); Researchers: Digital Cell Phones Might Interfere with Pacemakers, Robert W. Trott, Associated Press, Apr. 18, 1995.

*Primary Examiner*—Doris H. To

[57] ABSTRACT

A method and apparatus are disclosed that mitigate the induction of baseband interference that can from time-division radios (e.g., radios that radiate an RF signal with a time-varying power envelope). A radio comprising an embodiment of the present invention radiates, in transmit mode, an information-bearing signal. In some or all idle modes, the radio radiates at least one energy-reducing pulse, but in an idle-mode channel. These energy-reducing pulses reduce the energy in the fundamental frequency component of the average RF power envelope of the radio and also reduce the energy in the harmonics of the fundamental frequency.

20 Claims, 6 Drawing Sheets

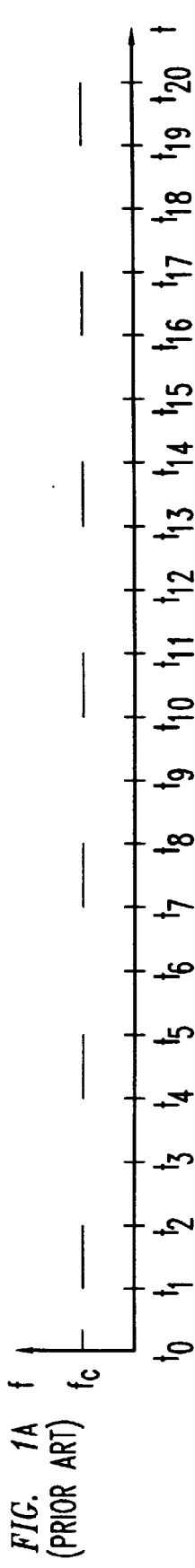
FIG. 1A (PRIOR ART)
FIG. 1B (PRIOR ART)
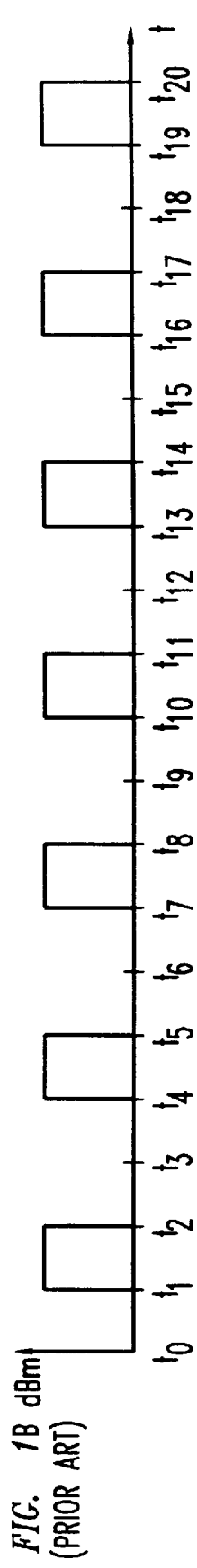
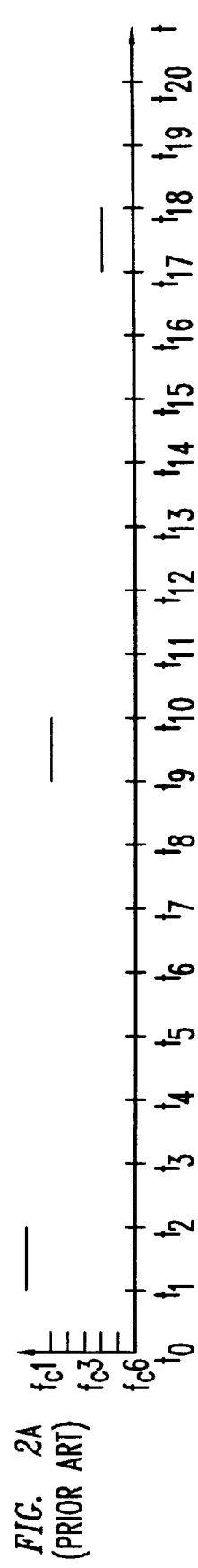
FIG. 2A (PRIOR ART)
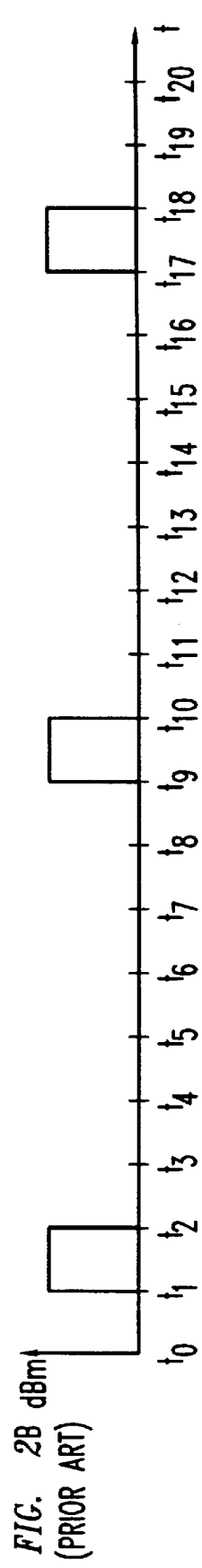
FIG. 2B (PRIOR ART)

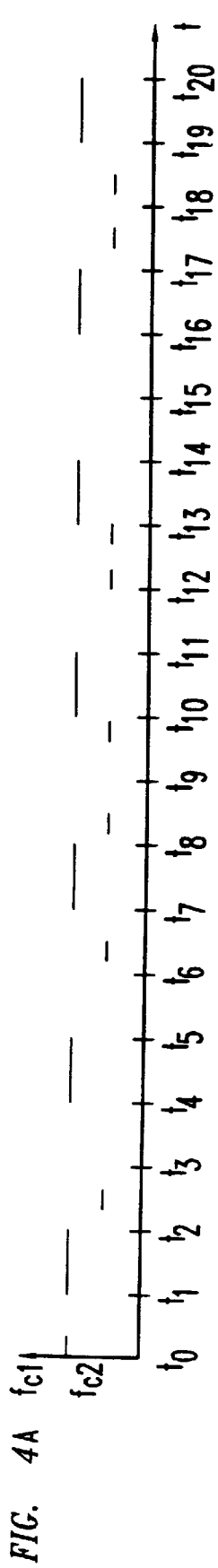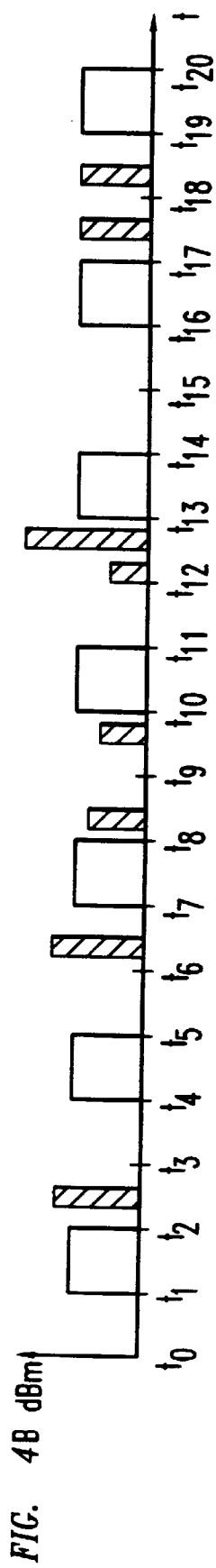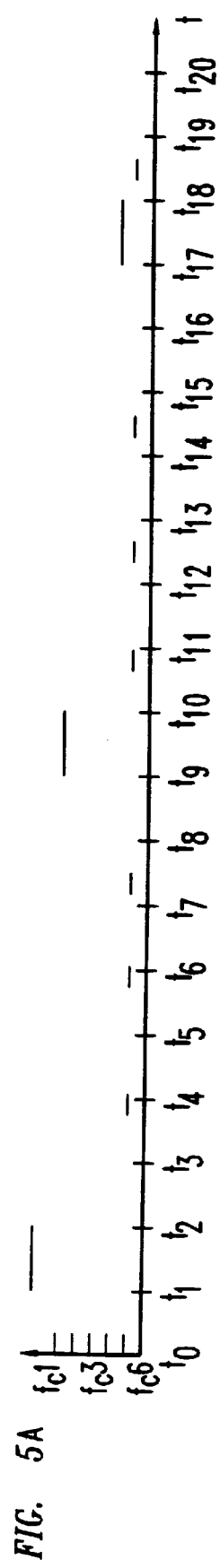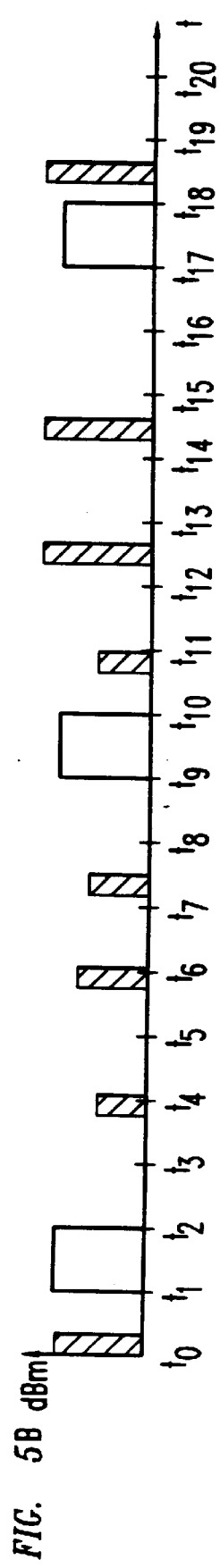
FIG. 4A
FIG. 4B
FIG. 5A
FIG. 5B

ENERGY-EFFICIENT TIME-DIVISION RADIO THAT REDUCES THE INDUCTION OF BASEBAND INTERFERENCE

CROSS REFERENCE TO RELATED APPLICATIONS

This application is related to the following and commonly assigned U.S. patent applications:

(1) Ser. No. 08/374381 (Attorney Docket "L. J. Greenstein 9-6-12"), filed Jan. 10, 1995, now abandoned, and entitled "A Time-Division Multiple Access Radio That Mitigates Baseband Interference;" and (2) Ser. No. 08/530,687 (Attorney Docket "L. J. Greenstein 11-7-18"), filed Sep. 19, 1995, now abandoned, and entitled "A Time-Division Multiple Access Radio With Reduced Baseband Interference." For the purpose of this specification, the teachings of both applications shall be called "Greenstein."

FIELD OF THE INVENTION

The present invention relates to wireless telecommunications in general and, more particularly, to an energy-efficient time-division radio that reduces the induction of baseband interference.

BACKGROUND OF THE INVENTION

Radios that employ "time-division technology," and, therefore, radiate a signal with a periodic average power envelope, are suspected of inducing baseband interference in some electrical devices that are characterized by a nonlinear response to radio waves. The operative mechanism could be, but is not necessarily, a second-order non-linearity in the device, which produces an effect similar to that of a square-law envelope detector. The fundamental frequency component of the average RF power envelope, and its harmonics, may contain sufficient energy to induce the baseband interference.

Time-division multiple access ("TDMA"), time-division duplex ("TDD"), and hybrid time-division multiple access/time-division duplex ("TDMA/TDD") are typical of such time-division systems. As used in this specification, time-division technology does not include time-division multiplexing ("TDM"), which refers to the technology used, for example, in a base station radio that transmits signals to multiple wireless terminals in a time-shared frequency-delimited channel. Unlike TDMA, TDD or TDMA/TDD radios, a TDM radio does not generate a time varying average RF power envelope and thus does not induce baseband interference.

There are several national and international standards that prescribe the use of TDMA and they include: Global Systems for Mobile Communication ("GSM"), the Telecommunications Industry Association Interim Standard No. 54 ("IS-54") and Japanese Digital Cellular. One standard that prescribes TDD is known as "CT-2." Two standards that prescribe TDMA/TDD include Personal Handy Phone and Digital European Cordless Telephone.

IS-54 prescribes the operation of a typical TDMA system. According to IS-54, three radios, each in a different wireless terminal, time-share a frequency-delimited channel for transmitting signals to a base station. For the purposes of this specification, that channel is called the "transmit-mode channel."

Each TDMA radio cycles between "transmit mode" and "idle mode." During a transmit mode, a TDMA radio modulates a carrier with an information-bearing signal and transmits the modulated carrier to a base station in the transmit-mode channel. During an idle mode, a TDMA radio does not transmit anything so as to (1) prevent an idle radio from interfering with the appropriately radiating radio (i.e., to preclude a cacophony in the transmit-mode channel) and (2) conserve battery power.

FIGS. 1a and 1b illustrate the frequency and average RF power envelope, respectively, (as a function of time) of the first of three IS-54 compliant radios, in different wireless terminals, that time-share a single transmit-mode channel, designated $f_{c_1}$. The transmit modes of the first radio occur during the time intervals $t_{3n+1}$ to $t_{3n+2}$ (where n is an integer), which coincide with the idle modes of the second and third radios. The idle modes of the first radio occur during the time intervals $t_{3n+2}$ to $t_{3n+4}$. Although not shown in FIGS. 1a and 1b, the transmit modes of the second radio occur during the time intervals $t_{3n}$ to $t_{3n+1}$, which coincide with the idle modes of the first radio and third radio. Similarly, the transmit modes of the third radio occur during the time intervals $t_{3n+2}$ to $t_{3n+3}$, which coincide with the idle modes of the first radio and second radio.

The rate at which a time-division radio cycles between transmit mode and idle mode is referred to as the "frame rate." This cycling causes the average RF power envelope radiated by the radio to vary with time. Specifically, as illustrated in FIG. 1b, an IS-54 compliant radio generates an average RF power envelope with a fundamental frequency component that is equal to the frame rate.

FIGS. 2a and 2b illustrate the frequency and average RF power envelope, respectively, (as a function of time) for a typical GSM compliant radio, as contained in a typical wireless terminal in the prior art.

According to the GSM standard, a plurality of time-division radios, in different wireless terminals, time-share and frequency-hop among a plurality of transmit-mode channels, as illustrated in FIG. 2a. Therefore, it is likely that a single GSM compliant radio will transmit in several frequency-delimited transmit-mode channels during the course of a single call. Like other time-division radios in the prior art, a typical GSM compliant radio ceases to radiate during idle mode. Thus, a GSM compliant radio also generates a time varying average RF power envelope that has a fundamental frequency component that is equal to the frame rate.

The operation of a TDD system is similar, although not identical, to a TDMA system. In a TDD system, two radios time-share a frequency-delimited channel for communication with each other. Each TDD radio periodically cycles between transmit mode and idle mode, and like a TDMA radio, during transmit mode modulates a carrier with an information-bearing signal and transmits the modulated carrier in the transmit-mode channel. For the same reasons as a TDMA radio, during idle mode a TDD radio does not transmit anything. And also like a TDMA radio, a TDD radio generates an average RF power envelope with a fundamental frequency component that is equal to the frame rate.

The operation of a TDMA/TDD radio is a hybrid of both TDMA and TDD systems and, too, generates an average RF power envelope with a fundamental frequency component that is equal to the frame rate.

FIGS. 3a and 3b illustrate the frequency and average RF power envelope, respectively, (as a function of time) for an IS-54 compliant radio as described in Greenstein ("IS-54 Greenstein radio"). For purposes of this specification, the term "Greenstein radio" means the genus of radios that comprise embodiments of the invention described in Greenstein, including but not limited to the IS-54 Greenstein radio. One IS-54 Greenstein radio transmits an information-bearing signal during transmit mode (e.g., during the time intervals from $t_{3n+1}$ to $t_{3n+2}$, where n is an integer), with a carrier frequency, $f_{c1}$, in the transmit-mode channel. During idle mode (e.g., during the time intervals $t_{3n+2}$ to $t_{3n+4}$), the IS-54 Greenstein radio continues to transmit, but with a different carrier frequency, $f_{c2}$, in a different frequency-delimited channel, called the "idle-mode channel."

Because there is no fluctuation in the average RF power envelope radiated by a Greenstein radio, it will not induce baseband interference. But because a Greenstein radio radiates continuously, it consumes more power than a time-division radio in the prior art. For example, an IS-54 Greenstein radio typically consumes three times as much power as an IS-54 compliant radio in the prior art.

Typically, a radio cannot instantaneously change its radiating frequency. Therefore, when a radio re-tunes while it is radiating (e.g., it switches between radiating in the transmit-mode channel and radiating in the idle-mode channel), the radio momentarily radiates in the channels in-between as it re-tunes from the old frequency to the new. This is known as the "frequency sweep-through" effect and it can cause interference to radios that are legitimately radiating in those channels. A Greenstein radio can exhibit the frequency sweep-through effect when switching between radiating in the idle and the transmit modes.

SUMMARY OF THE INVENTION

Embodiments of the present invention can induce less baseband interference in electrical devices than time-division radios in the prior art without the costs and disadvantages of these other time-division radios. Specifically, embodiments of the present invention can consume less power and can avoid "frequency sweep-through" effects. Furthermore, embodiments of the present invention can be compatible with existing time-division systems and standards and do not require modifications to the air-interface.

An illustrative embodiment of the present invention comprises a time-division radio that transmits normally during transmit mode and periodically or sporadically transmits during idle mode. During transmit mode, the time-division radio transmits a signal in one or more transmit-mode channels. During some or all of the idle modes, the time-division radio transmits at least one signal or pulse that has a duration less than the duration of the idle mode, but in one or more idle-mode channels that are designated for that purpose.

By transmitting one or more pulses in the idle-mode channel, the shape and/or periodicity of the average RF power envelope can be altered and its affects abated.

Advantageously, embodiments of the present invention also provide an engineer with a degree of design freedom to tailor a time-division radio within the teachings of the present invention to meet specific system requirements. Specifically, embodiments of the present invention enable the engineer to trade-off power savings against effectiveness in mitigating the induction of baseband interference.

BRIEF DESCRIPTION OF THE DRAWING

For a more complete understanding of the present invention, reference is now made to the accompanying drawings in which like numbers indicate like features and wherein:

FIGS. 1a and 1b are graphs that illustrate the frequency and average RF power envelope, respectively, (as a function of time) of a typical IS-54 compliant TDMA radio in the prior art;

FIGS. 2a and 2b are graphs that illustrate the frequency and average RF power envelope, respectively, (as a function of time) of a typical GSM compliant TDMA radio in the prior art;

Figs 4a and 4b are graphs that illustrate the frequency and average RF power envelope, respectively, (as a function of time) for an embodiment of the present invention that is IS-54 compliant;

FIGS. 5a and 5b are graphs that illustrate the frequency and average RF power envelope, respectively, (as a function of time) for an embodiment the present invention that is GSM compliant;

DETAILED DESCRIPTION

FIGS. 4a and 4b illustrate a typical frequency and average RF power envelope, respectively, (as a function of time) for an illustrative embodiment of the present invention that is IS-54 compliant. During transmit mode (e.g., during the time intervals from $t_{3n+1}$ to $t_{3n+2}$, where n is an integer), the illustrative embodiment transmits conventionally in the transmit-mode channel, $f_{c1}$. During all or some of the idle modes (e.g., during the time intervals from $t_{3n+1}$ to $t^{3n+2}$), the illustrative embodiment transmits one or more pulses, but in the idle-mode channel, $f_{c2}$. A "pulse" is an increase in the average RF power envelope over some duration. For the purposes of this specification, those pulses transmitted during idle mode are referred to as "energy-reducing" pulses because they can reduce the energy in the fundamental frequency component of the average RF power envelope of the signal.

By radiating one or more energy-reducing pulses in the idle-mode channel, the shape and/or periodicity of the average RF power envelope can be altered and its affects abated. This is because the energy-reducing pulses can reduce the energy in the fundamental frequency component of the average RF power envelope and can also reduce the energy in the harmonics of the fundamental frequency. Furthermore, because the illustrative embodiment of the present invention does not radiate continuously, it can consume less power than a Greenstein radio.

Figure 3A:
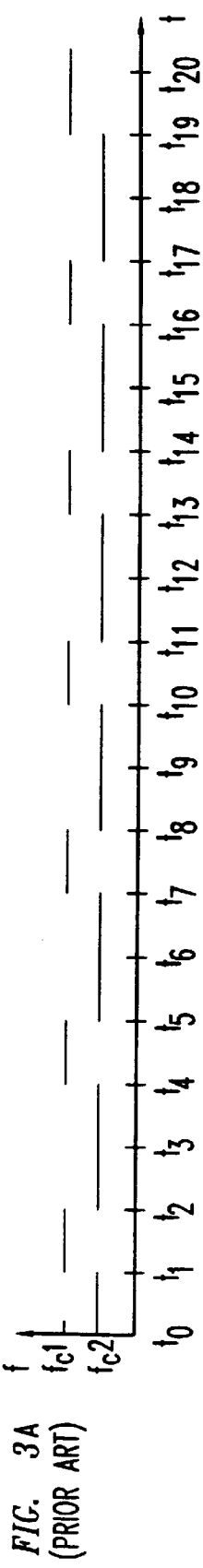
Figs 3a and 3b are graphs that illustrate the frequency and average RF power envelope, respectively, (as a function of time) for an IS-54 compliant TDMA radio described in Greenstein.
Figure 3B:
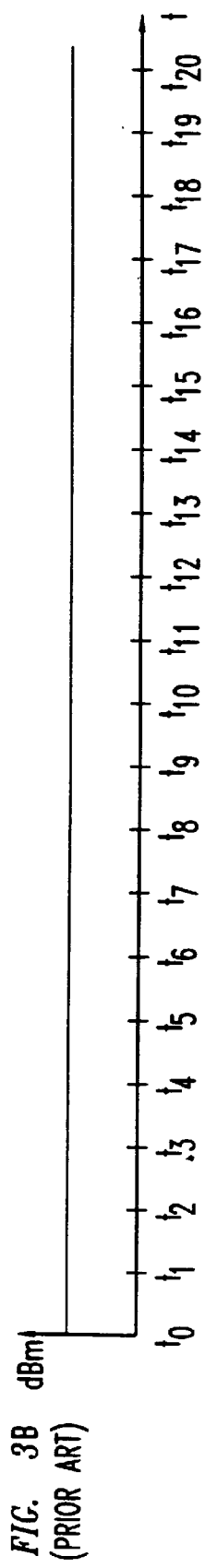
Figure 8:
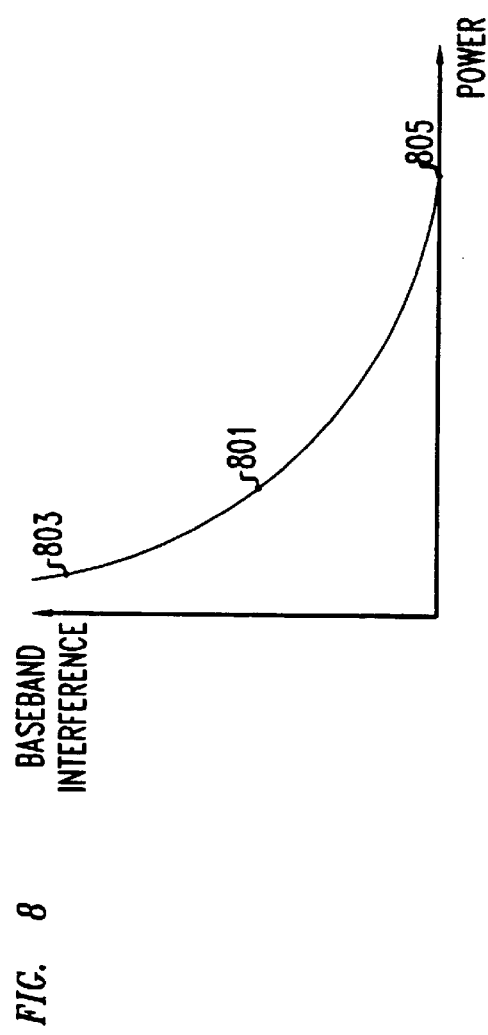
FIG. 8 is a graph that illustrates the power consumed by embodiments of the present invention as compared with interference induced in other electronic devices.

An engineer who implements embodiments of the present invention has the freedom to design radios that meet a variety of baseband interference and power requirements, as shown in FIG. 8. In FIG. 8, curve 801 represents the battery power consumed by a time-division radio as plotted against the potential baseband interference induced in electrical devices. Point 803 represents a typical time-division radio in the prior art. Additionally, point 805 represents a typical Greenstein radio. Embodiments of the present invention can be designed that fall anywhere on curve 801 between points 803 and 805. It should be understood, however, that embodiments of the present invention that begin to approach a Greenstein radio on curve 801 (i.e., point 805) can begin to exhibit frequency sweep-through effects. By carefully selecting the parameters discussed below for the energy-reducing pulses, a design engineer controls the power consumption by the radio and the potential for baseband interference with electronics devices. Embodiments of the present invention thus enable the engineer to trade-off power savings against mitigation effectiveness by choosing the parameters of the idle-mode transmissions.

Figure 6:
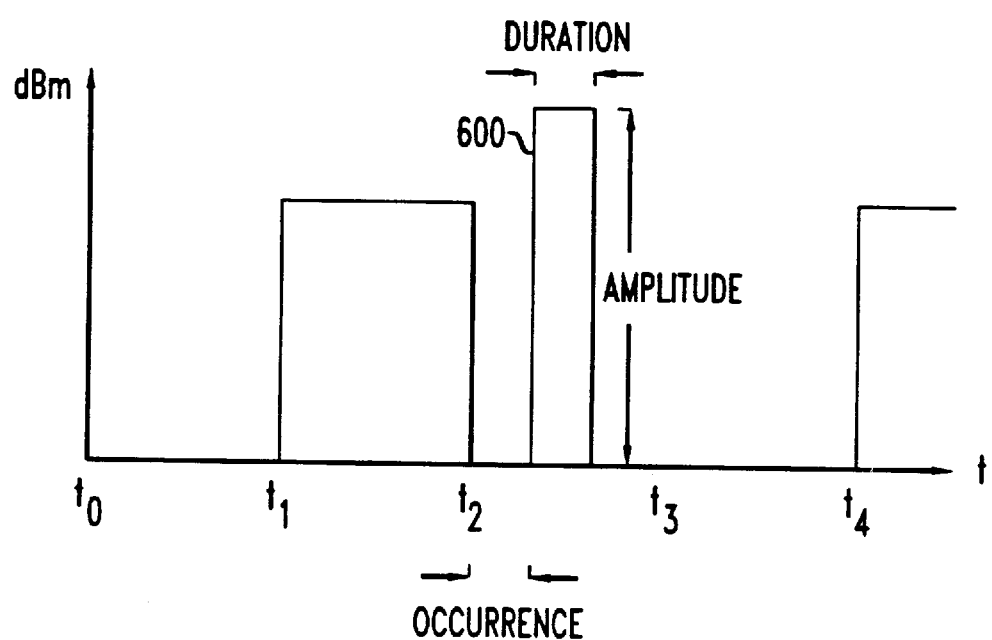
FIG. 6 illustrates an average RF power envelope (as a function of time) of an embodiment of present invention.

FIG. 6 illustrates, in greater detail, a portion of the average RF power envelope of FIG. 4b. The shape of an energy-reducing pulse is defined by the average RF power envelope of the signal radiated in the idle-mode channel. Energy-reducing pulse 600 is characterized by at least three parameters: (1) duration, (2) amplitude and (3) occurrence. The duration of an energyreducing pulse indicates for how long the radiated energy of the pulse is above some threshold. In embodiments of the present invention, the duration of energy-reducing pulse 600 is advantageously less than the duration of a single idle mode (e.g., the time from $t_2$ to $t_4$ in FIG. 6). Furthermore, when more than one energy-reducing pulse is transmitted during an idle mode, the total duration is also advantageously shorter than the idle mode.

The amplitude of an energy-reducing pulse indicates the energy in the pulse. Typically, the amplitude of an energy-reducing pulse can be greater than, less than, or substantially equal to the amplitude of the transmit-mode transmissions. The occurrence of energy-reducing pulse 600 indicates its position within the idle mode. Although the shape of the energy-reducing pulses in the figures are depicted as rectangular, in practice they can be any shape (e.g., triangular, trapezoidal, approximately trapezoidal, semi-circular, mesa or butte-shaped).

The number of energy-reducing pulses per idle mode, their duration, amplitude and occurrence may change periodically, sporadically or be constant. For example, illustrative embodiments could radiate energy-reducing pulses according to a pre-programmed sequence, or could adaptively change the number of energy-reducing pulses per idle mode, their duration, amplitude and/or occurrence in response to remote programming or other real-time environmental factors.

In particular, an illustrative embodiment of the present invention could sense when baseband interference was being induced in a device and adaptively change, using feed-back principals, the number and character of energy-reducing pulses so as to mitigate the interference. Advantageously, embodiments of the present invention select the number, duration, amplitude and occurrence of energy-reducing pulses so as to consume less power than a Greenstein radio. It should also be understood that embodiments of the present invention can be designed that consume more power than a Greenstein radio. It will be clear to those skilled in the art how, using well-known spectral analysis techniques, to choose these parameters to mitigate baseband interference at a particular frequency or frequencies.

When energy-reducing pulses are not radiated immediately following or immediately preceding transmit-mode, embodiments of the present invention typically avoid the frequency sweep-through problem because the embodiment can first stop radiating, then re-tune, and then resume radiating. For example, the occurrence of the first energy-reducing pulse is advantageously sufficiently after the end of the transmit mode to enable the radio to re-tune to the idle-mode channel while the embodiment is not radiating.

In the illustrative embodiment, it is inconsequential whether there is any information content to the signal whose average RF power envelope forms an energy-reducing pulse. For example, an embodiment of the present invention can transmit in the idle-mode channel the information-bearing signal that was transmitted during the previous transmit mode, or, alternatively, it can transmit an unmodulated carrier.

A plurality of embodiments of the present invention can contemporaneously radiate into the idle-mode channel, which reduces the amount of spectrum that is needed for the idle-mode transmissions. For example, all a wireless service provider need do is designate one channel across its entire system to function as the idle-mode channel. Thereafter, the wireless service provider can program or remotely indicate to those time-division radios in its system that incorporate embodiments of the invention which are the idle-mode channel or channels. Advantageously, a time-division radio that embodies the present invention does not require any modification to the air interface of the current standard systems. Furthermore, wireless terminals incorporating embodiments of the present invention can operate with time-division systems that interact with wireless terminals that do not incorporate embodiments of the present invention.

FIGS. 5a and 5b similarly depict the frequency and average RF power envelope for an embodiment of the present invention that is GSM compliant. Although a GSM compliant radio additionally frequency hops, it will be clear from the present disclosure to those skilled in the art how to make and use a GSM compliant radio that embodies the present invention. Furthermore, it will be clear from the present disclosure to those skilled in the art how to make and use embodiments of the present invention that operate with other time-division radios (e.g., TDD and TDMA/TDD).

Figure 7:
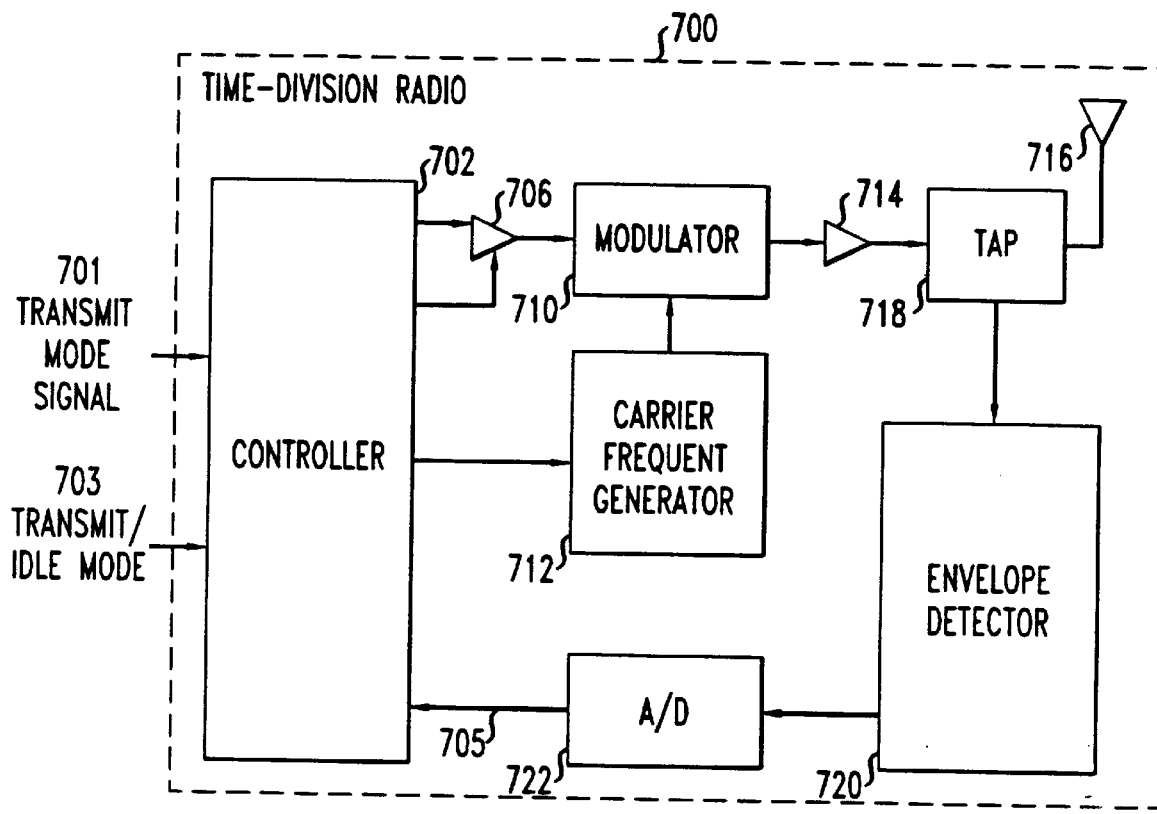
FIG. 7 is a block diagram of an illustrative embodiment of the present invention.

FIG. 7 depicts a block diagram of an illustrative embodiment of the present invention. As described above, time-division radio 700 shares a frequency channel, the "transmit-mode channel," with one or more other radios (not shown), which may or may not also incorporate embodiments of the present invention. Time-division radio 700 periodically cycles between (1) transmit mode, when an information-bearing signal is radiated in the transmit-mode channel, and (2) idle mode, when nothing is radiated in the transmit-mode channel, but one or more energyreducing pulses are typically radiated in the idle-mode channel.

Time-division radio 700 illustratively comprises controller 702, amplifier 706, modulator 710, amplifier 714, tap 718, antenna 716, carrier frequency generator 712, envelope detector 720 and analog-to-digital converter 722. Controller 702 receives three inputs: (1) a transmit/idle-mode signal on lead 701 that indicates when time-division radio 700 is in transmit or idle mode, (2) a transmit-mode signal on lead 703, which is typically information-bearing (e.g., voice, data, etc.) and that is to be transmitted during transmit mode, and (3) a power-feedback signal on lead 705 that monitors the radiated averaged RF power envelope.

Controller 702 feeds amplifier 706, which is typically a low-noise class A amplifier. The gain of amplifier 706 is advantageously variable and controlled by controller 702. Amplifier 706 advantageously passes an output signal to modulator 710 where it modulates a carrier signal received from carrier frequency generator 712. Carrier frequency generator 712 generates a carrier with a frequency under the control of controller 702. The modulated signal output from modulator 710 is fed into amplifier 714 and to antenna 716, in well-known fashion. Tap 718 samples the signal fed to antenna 716 and feeds the samples to envelope detector 720. Envelope detector 720 feeds an output signal to A/D converter 722 to provide a power feedback signal to controller 702.

In operation, the transmit/idle signal establishes when time-division radio 700 is in transmit mode and when it is in idle mode. During transmit mode, controller 702 passes the transmit-mode signal to amplifier 706. Controller 702 also causes carrier frequency generator 712 to output a carrier signal to modulator 710 that corresponds to the transmit-mode channel for time-division radio 700. The modulated output of modulator 710 is amplified by amplifier 714 and transmitted by antenna 716.

During some or all of idle modes, controller 702 causes time-division radio 700 to radiate one or more energy-reducing pulses in the idle-mode channel. Controller 702 determines for each idle mode, the number of energy-reducing pulses and their duration, amplitude and occurrence. Controller 702 also generates the idle-mode signal, whose average power envelope will form a pulse, and outputs the signal to amplifier 706.

Controller 702 can, for example, vary the gain of amplifier 706 to establish the amplitude, occurrence and duration of the energy-reducing pulses. Alternatively, the idle-mode signal from controller 702 can comprise a series of pulses that establish the amplitude, occurrence and/or duration of the energy-reducing pulses. Controller 702 also causes carrier frequency generator 712 to provide a carrier signal to modulator 710 that corresponds to the idlemode channel for time-division radio 700.

Figure 9:
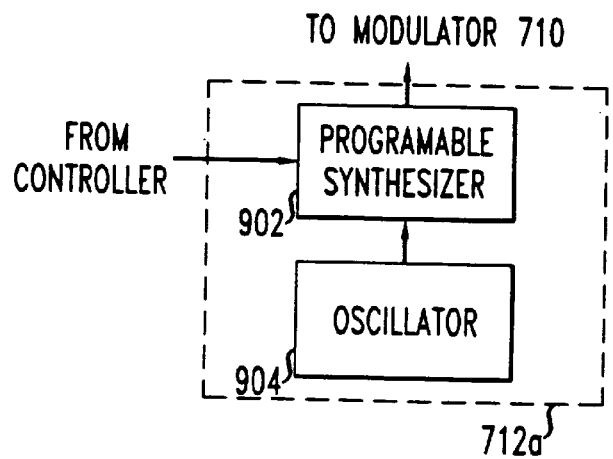
FIG. 9 is a block diagram of a carrier frequency generator for use in the radio of FIG. 7, according to the teachings of the present invention.

FIG. 9 depicts a block diagram of an embodiment of carrier frequency generator 712a for use with time-division radio 700 of FIG. 7. Programmable synthesizer 902 receives a signal that indicates whether time-division radio 700 is in transmit or idle mode. When time-division radio 700 is in transmit mode, programmable synthesizer 902 synthesizes a carrier in the transmit-mode channel assigned to time-division radio 700. When, however, time-division radio 700 is in idle mode, programmable synthesizer 902 synthesizes a carrier with a frequency corresponding to the idle-mode channel. Oscillator 904 provides a reference signal to programmable synthesizer 902.

Figure 10:
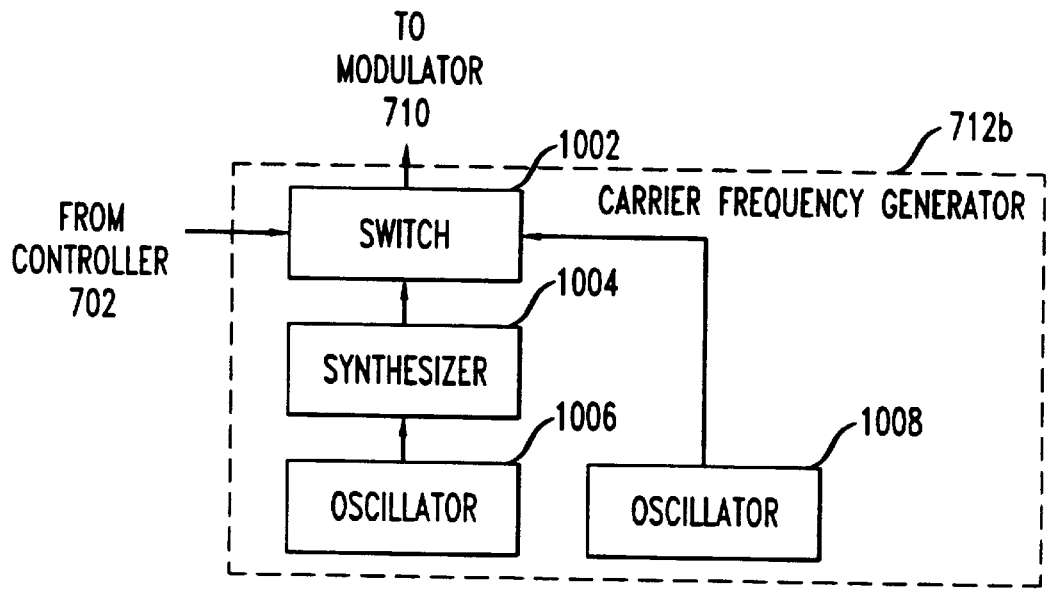
FIG. 10 Is a block diagram of another carrier frequency generator for use in the radio of FIG. 7, according to teachings of the present invention.

FIG. 10 depicts a block diagram of another embodiment of a carrier frequency generator 712b for use with time-division radio 700. Switch 1002 receives three signals: (1) a control signal that indicates whether time-division radio 700 is in transmit mode or idle mode, (2) the synthesized carrier in the transmit-mode channel assigned to time-division radio 700 (from synthesizer 1004 and oscillator 1006), and (3) a carrier for the idle-mode channel from oscillator 1008. When time-division radio 700 is in transmit mode, switch 1002 directs the carrier from programmable synthesizer 1004 to modulator 710. When time-division radio 700 is in idle mode, switch 1002 directs the carrier from oscillator 1006 to modulator 710. The illustrative embodiment in FIG. 10 is advantageous in that synthesizer 1004 need not be programmable and oscillator 1008 can be relatively less precise, and hence relatively less expensive, than oscillator 1006.

Figure 11:
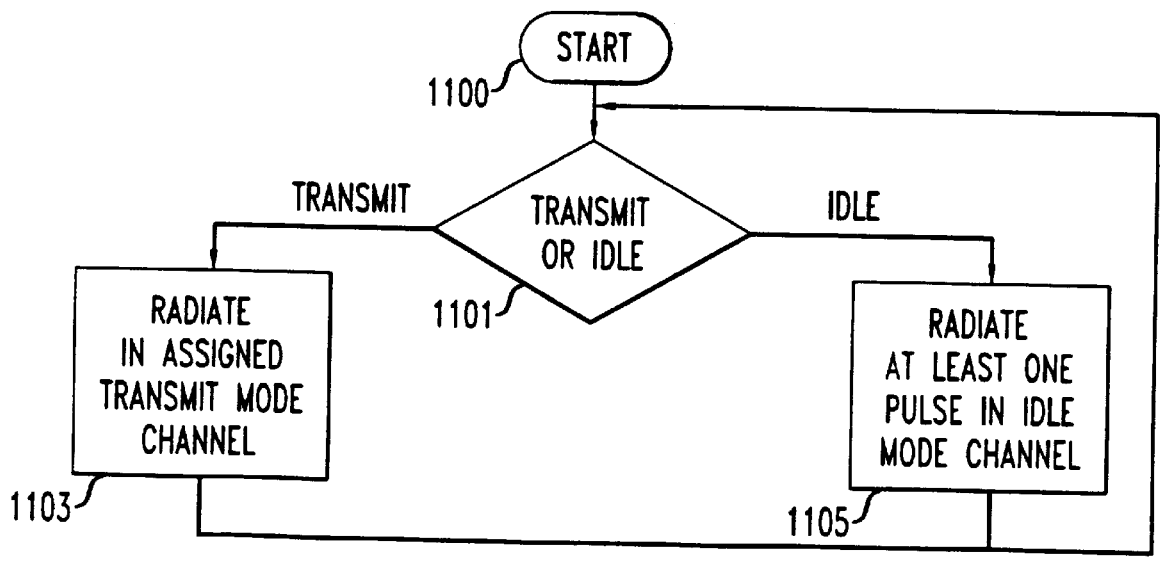
FIG. 11 is a flow chart of the operation of a typical embodiment of the present invention.

FIG. 11 is a flow chart that depicts the operation of an illustrative embodiment of the present invention. The method begins at block 1100. At block 1101, a decision is made whether the TDMA radio is in transmit or idle mode. When the radio is in transmit mode, the method proceeds to block 1103 and radiates an information-bearing signal in the transmit-mode channel, which is time-shared with other TDMA radios. Control then returns to block 1101.

At block 1101, when the TDMA radio is in idle mode, the method proceeds to block 1105. At block 1105, the TDMA radio transmits at least one pulse in the idle-mode channel. As described above, the TDMA radio establishes the duration, amplitude and occurrence of each pulse such that the pulses reduce the energy in the fundamental frequency component frequency of the average RF power envelope and the harmonics of the fundamental frequency.

Although embodiments of the present invention have been described in detail, it is understood that various changes, alterations and substitutions can be made hereto without departing from the spirit and scope of the present invention as defined by the appended claims. For example, embodiments of the present invention can be used with TDMA systems wherein more than three users share the same transmit channel. Additionally, the teachings of the present invention are applicable to a TDMA system that uses frequency hopping (e.g., a GSM compliant wireless terminal). Furthermore, it will be clear to those skilled in the art how embodiments of the present invention can be made and used that use more than one transmit-mode channel and/or more than one idle-mode channel. And furthermore, the described embodiments may be incorporated into a wireless terminal with one or more other radios, which may be known as "dual-mode" or "tri-mode" wireless terminals.

What is claimed is:

1. A method for operating a time-division radio that periodically cycles between a transmit mode and an idle mode, said method comprising:

during at least one transmit mode, radiating an information-bearing signal in a transmit-mode channel; and during at least one idle mode, radiating at least one energy-reducing pulse in an idle-mode channel, said energy-reducing pulse having a duration less than the duration of said idle mode;

wherein said energy-reducing pulse reduces the energy in a fundamental frequency component of the average RF power envelope radiated by said time-division radio.

2. The method of claim 1 wherein at least one energy-reducing pulse is radiated during every idle mode.

3. The method of claim 1, wherein said step of radiating at least one energy-reducing pulse comprises the step of radiating at least one energy-reducing pulse with an average RF power amplitude that is greater than the average RF power amplitude of said information-bearing signal.

4. The method of claim 1, wherein said step of radiating at least one energy-reducing pulse comprises the step of radiating at least one energy-reducing pulse with an average RF power that is substantially equal to the average RF power of said information-bearing signal.

5. The method of claim 1, wherein said step of radiating at least one energy-reducing pulse comprises the step of radiating at least one energy-reducing pulse with an average RF power that is less than the average RF power of said information-bearing signal.

6. The method of claim 1, wherein at least two temporally distinct energy-reducing pulses are radiated during one idle mode.

7. The method of claim 6, wherein the two temporally distinct energy-reducing pulses have different average RF power amplitudes.

8. The method of claim 6, wherein the two temporally distinct energy-reducing pulses have different durations.

9. The method of claim 1, wherein said step of radiating at least one energy-reducing pulse during said idle mode comprises radiating energy-reducing pulses with different occurrences during at least two successive idle modes.

10. The method of claim 1 wherein said time-division radio is a TDMA radio.

11. The method of claim 1 wherein said time-division radio is a TDD radio.

12. The method of claim 1 wherein said time-division radio is a TDMA/TDD radio.

13. The method of claim 1 wherein said time-division radio frequency hops in successive transmit modes.

14. A method of operating a time-division radio that periodically cycles between a transmit mode and an idle mode, said method comprising:

radiating a first signal during said transmit mode in at least one frequency-delimited transmit-mode channel; and radiating a second signal during at least one of said idle modes in an idle-mode channel, such that said second signal has an average RF power envelope that has a duration that is shorter than said idle model;

wherein the second signal reduces the energy in a fundamental frequency component of the average RF power envelope of the time-division radio.

15. The method of claim 14, wherein the average RF power envelope has an approximately trapezoidal shape.

16. The method of claim 14 wherein the duration, amplitude and occurrence of said second signal change periodically.

17. The method of claim 14 wherein the duration, amplitude and occurrence of said second signal change according to a pre-preprogrammed sequence.

18. A time-division radio that periodically cycles between a transmit mode and an idle mode, said time-division radio comprising:

a controller that generates at least one energy-reducing pulse to be transmitted during an idle-mode of said time-division radio, said energy-reducing pulse having a duration that is less than the duration of the idle mode and wherein the energy-reducing pulse reduces the energy in a fundamental frequency component of the average RF power envelope of the time-division radio;

a carrier frequency generator; and a modulator responsive to said carrier frequency generator and said controller, said modulator operable to modulate a first carrier signal with an information-bearing signal during transmit mode and operable to modulate a second carrier signal with said energy-reducing pulses during said idle mode, said second carrier signal being different than said first carrier signal.

19. The radio of claim 18, wherein said carrier frequency generator comprises:

a first oscillator;

a synthesizer responsive to said oscillator that produces said first carrier signal;

a second oscillator that produces said second carrier signal;

a switch that receives said first and second carrier signals, that directs said first carrier signal to said modulator when said radio is in said transmit mode, and that directs said second carrier signal to said modulator when said radio is in said idle mode.

20. The radio of claim 18, wherein said carrier frequency generator comprises:

an oscillator that provides a reference signal;

a programmable synthesizer responsive to said oscillator that generates first and second carrier signals for said modulator; and a controller coupled to said programmable synthesizer that directs said programmable synthesizer to produce said second carrier signal when said radio is in said idle mode.

* * * * *